United States Patent
Hirama

(10) Patent No.: US 8,705,126 B2
(45) Date of Patent: Apr. 22, 2014

(54) PRINTING DEVICE AND PRINT JOB CONTROL METHOD

(75) Inventor: Kenichi Hirama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 290 days.

(21) Appl. No.: 13/230,945

(22) Filed: Sep. 13, 2011

(65) Prior Publication Data

US 2012/0062915 A1 Mar. 15, 2012

(30) Foreign Application Priority Data

Sep. 15, 2010 (JP) .................................. 2010-206580

(51) Int. Cl.
*H04N 1/60* (2006.01)
*G06K 15/02* (2006.01)

(52) U.S. Cl.
USPC ........... 358/1.9; 358/1.15; 358/502; 358/534; 358/518; 399/39; 399/27; 399/53; 347/5

(58) Field of Classification Search
USPC .............................. 358/1.9, 1.15, 298; 399/39
See application file for complete search history.

(56) References Cited

U.S. PATENT DOCUMENTS 6,324,356 B1 * 11/2001 Inoue ............................... 399/39
2005/0206923 A1 * 9/2005 Utsumi et al. ................. 358/1.9

FOREIGN PATENT DOCUMENTS

JP     A-2003-295568     10/2003

* cited by examiner

*Primary Examiner* — Quang N Vo
(74) *Attorney, Agent, or Firm* — Muncy, Geissler, Olds & Lowe, P.C.

(57) ABSTRACT

A printing device includes a receiving part receiving print job data, an analysis part, a memory part, an image forming part that executes a print process of image information using first and second consumable products and that includes a remaining amount detecting part, and a print control unit that controls the print process. When the remaining amount of the first consumable product is detected to be lower than a predetermined amount, the print process using the first consumable product is temporarily suspended, the memory part stores the image information and the print information of the print job data that are sequentially received by the receiving part. When the print information for another print process not using the first consumable product is stored in the memory part, the print control unit deletes information relating to the print job data of the suspended print process.

27 Claims, 8 Drawing Sheets

PRINTING DEVICE AND PRINT JOB CONTROL METHOD

CROSS REFERENCE TO RELATED APPLICATION

The present application is related to, claims priority from and incorporates by reference Japanese patent application No. 2010-206580, filed on Sep. 15, 2010.

TECHNICAL FIELD

The present invention relates to a printing device that prints print information, and particularly relates to a printing device and a print job control method using multi-color developers, which are consumable products.

BACKGROUND

Conventionally, a printing device executes printing using plural colors of toners, which are consumable products, including, for example, black (K), yellow (Y), magenta (M) and cyan (C). When the remaining amount of any of the Y toner, M toner and C toner (hereafter, Y toner, M toner and C toner may be collectively referred to as "color toner"), which are toners for executing color printing using the plural colors of toners, runs out, a print job for color printing is temporarily suspended in a state to wait for a user's instructions, for instance, while the user is reminded to refill the toner of which the remaining amount has run out, and a processing method for a print job is determined based on the user's instructions (for example, see JP Laid-Open Patent Application No. 2003-295568, see page 3 and FIG. 2).

However, in the above-described device, there is a problem that, when the user does not perform a recovery operation, such as refilling the run-out toner or cancelling the temporarily-suspended print job, and abandons the print job, subsequent printing that does not use the color toners, that is, a limited color print job that makes prints using only a single color toner, is also put on hold. Therefore, one of objects of the present application is to solve the problem that occurs when the user abandons the recovery operation.

SUMMARY

Accordingly, a printing device includes: a receiving part that receives print job data; an analysis part that generates image information and print information including print conditions for the image information based on the print job data; a memory part that stores the image information and the print information; an image forming part that executes a print process of the image information using a first consumable product and a second consumable product, and that includes a remaining amount detecting part that detects a remaining amount of the first consumable product and the second consumable product; and a print control unit that controls the print process by the image forming part based on the print information. When the remaining amount of the first consumable product is detected to be lower than a predetermined amount, the print process by the image forming part that uses the first consumable product is temporarily suspended, the memory part stores the image information and the print information of the print job data that are sequentially received by the receiving part and analyzed by the analysis part, and when the print information corresponding to the print job data for performing a print process that does not use the first consumable product is stored in the memory part, the print control unit deletes information relating to the print job data of the suspended print process that uses the first consumable product.

According to the present application, when a first consumable product runs out and a print job that uses the first consumable product is temporarily suspended, even when the user abandons the print job, when a print job that uses a second consumable product is included in print jobs to be processed subsequent to the current print job, that print job that uses the second consumable product is executed without waiting for the user's recovery operation.

DETAILED DESCRIPTION

First Embodiment

Figure 1:
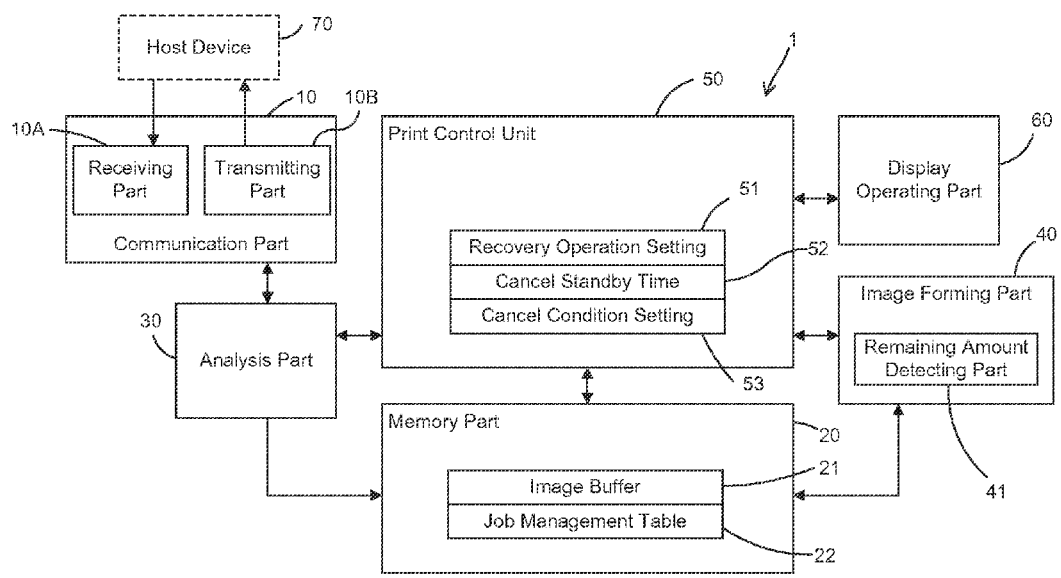
FIG. 1 is a block diagram showing a configuration of main parts of a printing device in a first embodiment according to the present application.

FIG. 1 is a block diagram showing a configuration of main parts of the printing device in the first embodiment according to the present application.

A printing device 1 is a light emitting diode (LED) type digital color multifunction machine and is configured with a communication part 10 that includes a receiving part 10A and a transmitting part 10B, an analysis part 30, a memory part 20, an image forming part 40, a print control unit 50 and a display part (e.g., display operating part 60).

The communication part 10 receives print job data from an external device (e.g., host device 70, such as a host computer or the like), via the receiving part 10A through a local area network (LAN), universal serial bus (USB), facsimile (FAX) communication line, wireless communication or the like, and outputs the print job data to the analysis part 30. The memory part 20 is a part that reads out and writes data from and into a memory medium, such as a random access memory (RAM), a hard disk and the like, and includes an image buffer 21 and a job management table 22. The image buffer 21 is an area that stores image information of the print job to be analyzed by the analysis part 30, as described later. The job management table 22 is a table that stores print information of the print job that the printing device 1 executes.

Figure 2:
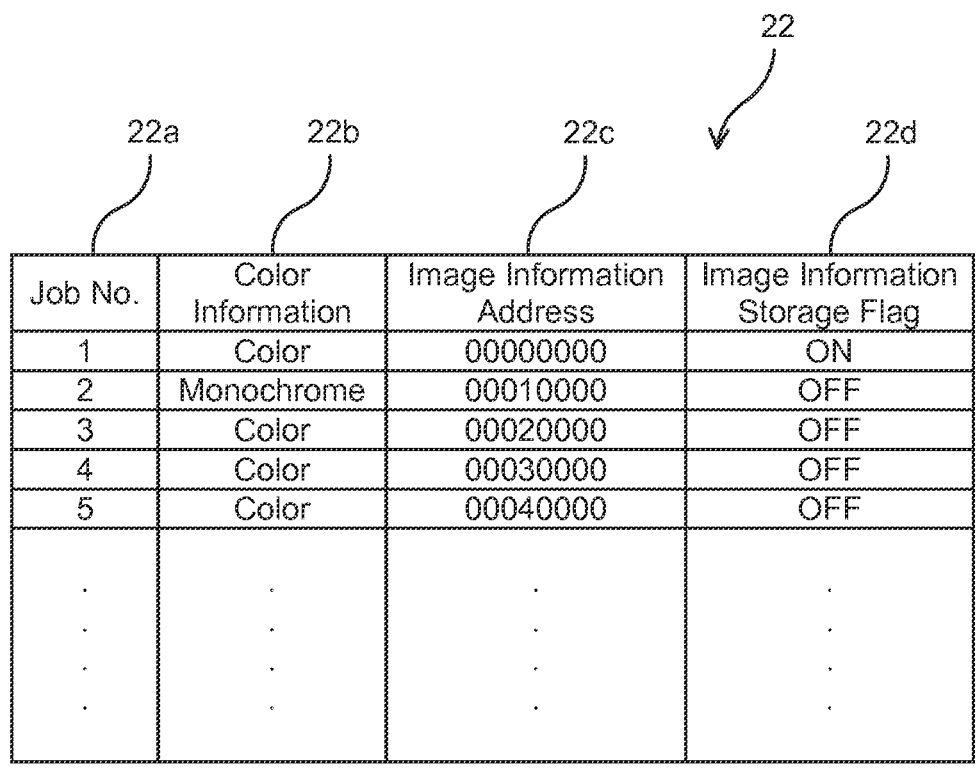
FIG. 2 is a job management table configuration diagram showing a configuration of a job management table.

Here, the configuration of the job management table 22 is described with reference to a job management table configuration diagram in FIG. 2.

The job management table 22 stores and manages a job number 22a, color information 22b, an image information address 22c and an image information storage flag 22d for every print job while associating with each other, and one entry (row) is added per single print job. The job number 22a is an identifier assigned for each print job for uniquely identifying the print job, and indicates the order in which to execute the print jobs. The color information 22b indicates the print color (color/monochrome) designated by the corresponding print job. The image information address 22c is address information of the image buffer 21 where the image information to be printed by the execution of the corresponding print job is stored. The image information storage flag 22d is a flag indicating whether or not the print job data of the corresponding print job(s) has all been received. When the print job data of the corresponding print job is all received, the flag is set to "ON".

Returning to FIG. 1, the analysis part 30 is a part that analyzes the print job data that is inputted from the communication part 10. The analysis part 30 analyzes print information that designates print conditions and the image information to be printed based on the print job data, adds the print information (job numbers, color information image information address and the like) to the job management table 22, and outputs a reception notification of the print job for instructing print execution to a print control unit 50 along with the job number of the corresponding print job. Then, the analysis part 30 stores the analyzed image information in the image buffer 21 at the address designated by the image information address, and updates the image information storage flag 22d of the corresponding job number in the job management table 22 to "ON" when the image information for one print job is completely stored in the image buffer 21.

The image forming part 40 is a part that forms a toner image on a print sheet based on the image information read out from the image buffer 21 of the memory part 20 in accordance with an instruction from the print control unit 50. In other words, the image forming part 40 supplies one print sheet from a sheet feeding tray in which a certain number of print sheets are stacked, from a top of the print sheets in a stack direction. After the toner image with designated colors is transferred to the supplied print sheet by four image forming units for black (K), yellow (Y), magenta (M) and cyan (C) arranged in respective order from an insertion side to an ejection side of the print sheet, the image forming part 40 carries the print sheet to a fuser. The toner is fixed to the print sheet with heat by a heater and pressure by a roller in the fuser, and the image forming part 40 ejects the print sheet to a stacker via the ejection part.

Here, color printing is performed using color toners (first consumable product) of Y toner, M toner and C toner, and monochrome printing is performed using a toner for monochrome printing (second consumable product), such as K toner.

In addition, the image forming part 40 includes a remaining amount detecting part 41 that monitors and detects the remaining amount of toner in the four image forming units. When at least one of the toners used for printing is detected to be lower than a predetermined amount, the image forming part 40 stops the subsequent supply of the print sheet. After the processing of all print sheets in the middle of the image forming process is completed and after the print sheets are ejected to the stacker, the image forming part 40 notifies the print control unit 50 of a "No Toner Error" message along with color information of the toner with the low remaining amount.

The print control unit 50 is a part that controls the print process of the image forming part 40. The print control unit 50 receives the reception notification of the print job received from the analysis part 30, reads out the print information from the job management table 22 based on the job number associated with the reception notification, and instructs the image forming part 40 to print. The print control unit 50 also displays the contents of the notification on the display operating part 60 and controls the print process of the image forming part 40 based on the preset recovery operation setting 51 described later.

Furthermore, here, it was explained that, when at least one toner used for printing becomes lower than a predetermined amount, the image forming part 40 spontaneously stops the supply of the subsequent print sheet, completes the processes for all print sheets in the middle of the image forming process, and ejects the print sheets to the stacker. However, for example, after notification of the "No Toner Error" message to the print control unit 50 along with the color information of the toner with low remaining amount, the above-described processing may be executed after receiving an instruction from the print control unit 50. In addition, a determination as to whether or not the remaining amount of toner has become lower than the predetermined amount may also be configured such that the print control unit 50 makes the determination after receiving the remaining amount information from the image forming part 40.

The recovery operation setting 51 is information for setting the operation of the print control unit 50 when at least one of the color toners used for printing becomes lower than the predetermined amount. When the recovery operation setting 51 is in the "Cancel Mode," the recovery operation setting 51 is set to either a "Standby Mode" for waiting until the user refills the toner or a "Cancel Mode" for cancelling the print job for which the printing is suspended based on a cancel standby time 52 and cancel condition setting 53. The cancel standby time 52 is the time period commencing from the notification of the "No Toner Error" message from the image forming part 40 to the start of the cancellation process of the print job for which the printing is suspended, when the recovery operation setting 51 is in the "Cancel Mode."

When the recovery operation setting 51 is in the "Cancel Mode, the cancel condition setting 53, as described later, is set to either "No Condition" for unconditionally cancelling a print job for which the printing is suspended, or "Reprintable" for cancelling a print job for which printing is suspended when the printing device 1 has not received all print job data for the suspended printing, that is, when the analysis part 30 has not set the image information storage flag 22d of the job management table 22 to "ON."

The display operating part 60 is a part that includes a liquid crystal panel and an input/output device, such as operation keys or the like for entering characters and numbers, and that displays the operation settings of the printing device 1 and the state of the printing device 1 on a screen. When a "No Toner Error" is detected by the image forming part 40, the "No Toner Error" message, the toner color(s) to be refilled and the like are displayed on the screen based on the notification from the print control unit 50. Further, the display operating part 60 displays a screen for the user to set the above-described recovery operation setting 51, cancel standby time 52 and cancel condition setting 53 of the print control unit 50, and notifies the set value(s) selected by the user to the print control unit 50.

Figure 3:
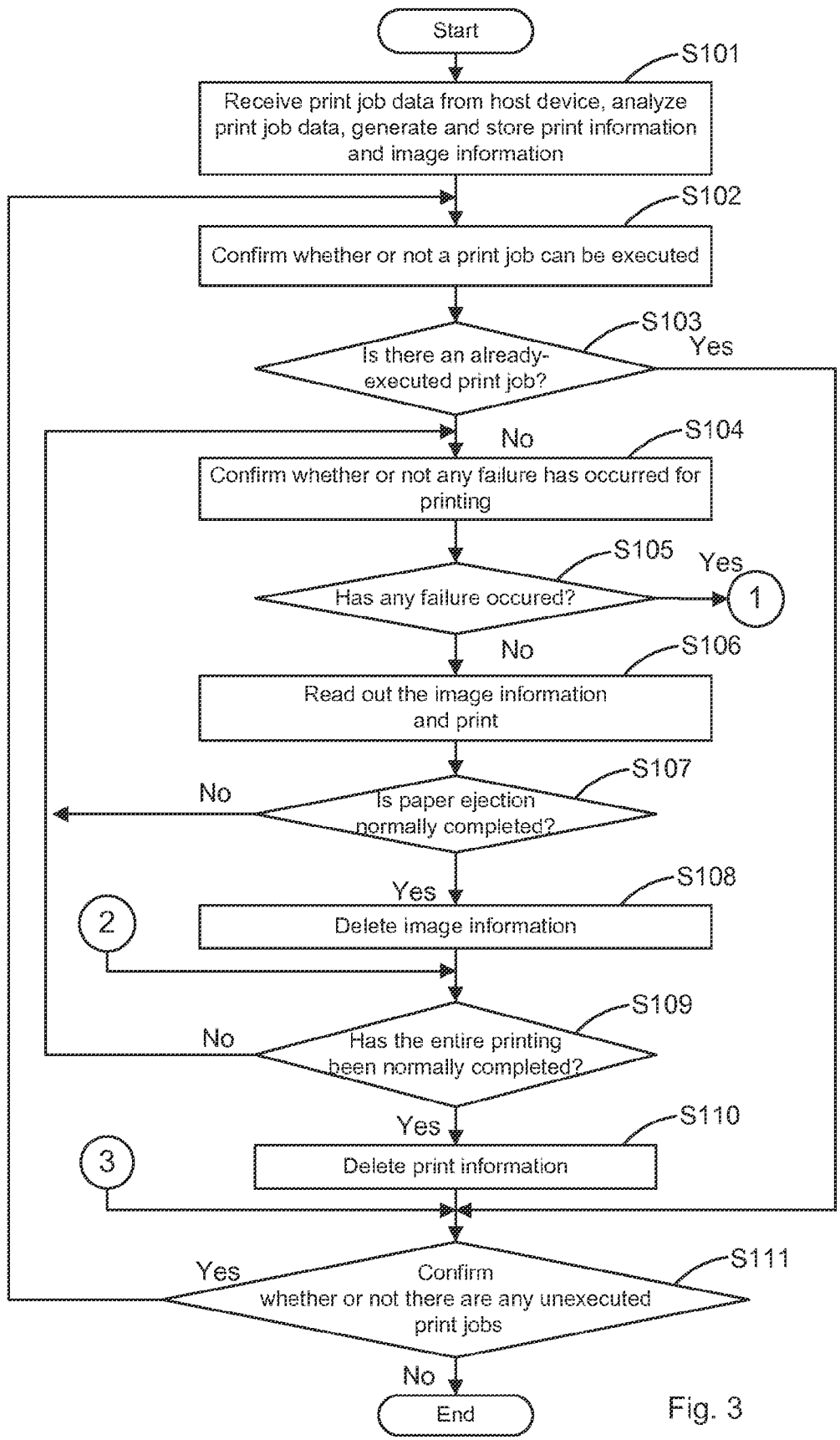
FIG. 3 is a flow diagram showing a printing operation of the printing device in the first embodiment.
Figure 4:
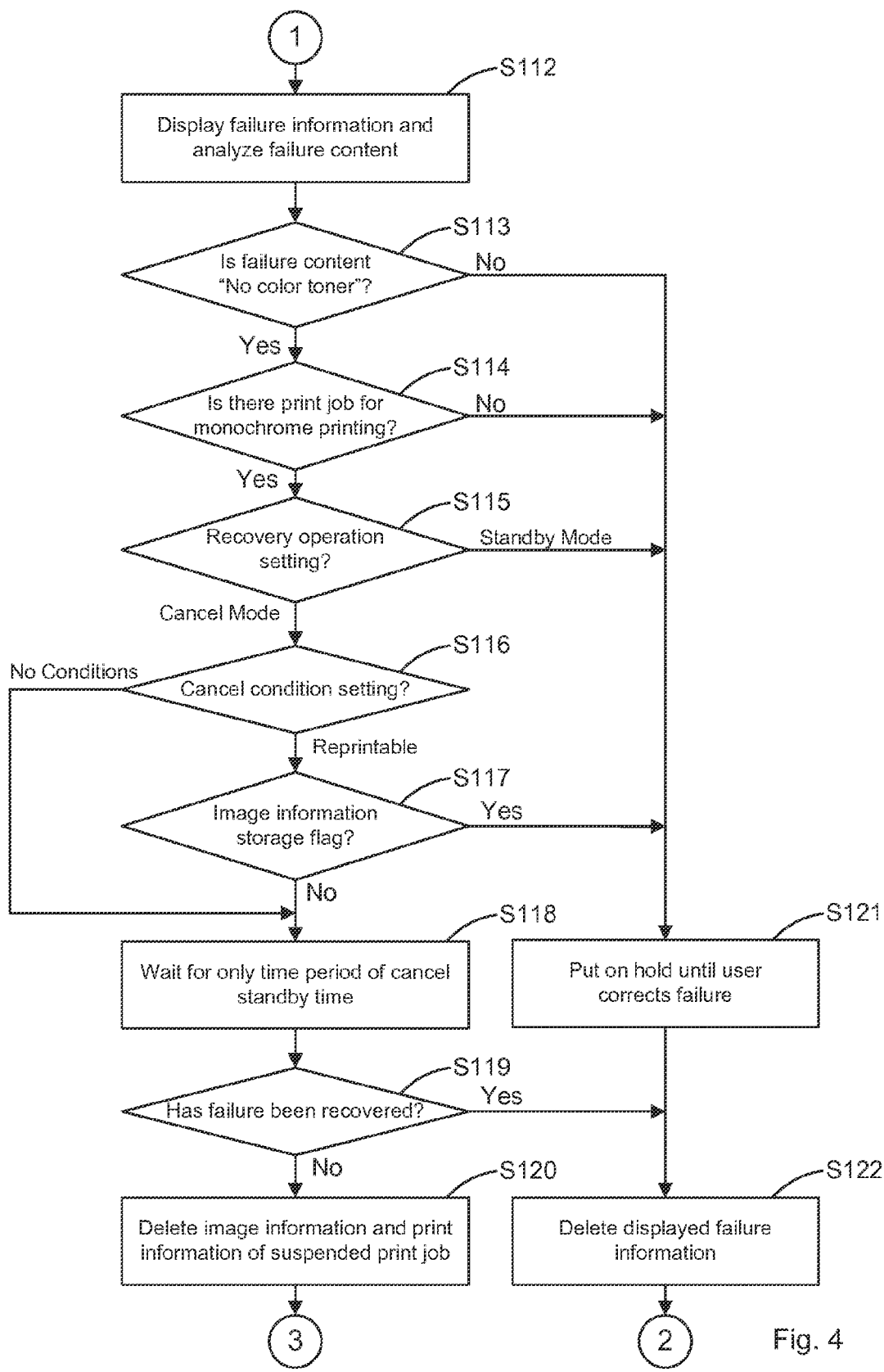
FIG. 4 is a flow diagram showing the operation of the printing device at the time when a failure occurs in the first embodiment.

FIG. 3 is a flow diagram showing the printing operation of the printing device 1 in the present embodiment, and FIG. 4 is a flow diagram showing the operation of the printing device 1 at the time when a failure occurs in the present embodiment. The operation of the printing device 1 is described hereafter with reference to the flow diagrams.

First, the printing operations of the printing device 1 are described with reference to the flow diagram in FIG. 3. The communication part 10 receives print job data from a host device 70, such as a host computer or the like, and outputs the print job data to the analysis part 30. The analysis part 30 analyzes the received print job data, and generates and stores print information including color information, a job part number, an image information address and the like obtained as a result of analysis, in the job management table 22 as a new entry, and notifies the print controller 50 of the reception notification of a print job along with the job number 22a of the new entry. Then, the analysis part 30 continues to analyze the print job data of the same print job received via the communication part 10, and stores the image information obtained as a result of the analysis the image buffer 21 at the address designated with the image information address (S101).

The print control unit 50 confirms whether or not a new print job indicated with a job number, which has been received along with the reception notification, can be executed in accordance with the reception notification received from the analysis part 30 (S102). When there is an already-executed print job (Yes, S103), the print control unit 50 waits for completion of the executed print job. In this case, S103 (Yes), S111 (Yes) and S102 are repeated until the executed print job is completed.

When there is no executed print job (No, S103), the print control unit 50 notifies the image forming part 40 of the job number inputted from the analysis part 30 as a print instruction, and the image forming part 40 confirms whether or not any failure has occurred (S104). When no failure has occurred (No, S105), the image forming part 40 identifies an entry for which the job number 22a matches the job number inputted from the print control unit 50, among the print jobs accumulated in the job management table 22. The image forming part 40 reads out the image information from the image buffer 21 based on the print information (image information address) of the print job in the identified entry, forms a toner image on a recording sheet based on the image information and ejects the sheet to the stacker (S106).

Furthermore, at S105, as explained hereafter, even if the image forming part 40 confirms that the failure as "No color toner" has occurred, the print job is determined as being printable when a new print job is monochrome printing. Then, the process moves on to S106, and the print process is executed.

When paper ejection to the stacker is normally completed (Yes, S107), the image forming part 40 deletes image information relating to the completed printing (S108), and prints the subsequent image information. When the entire printing for the same print job has been normally completed (Yes, S109), the image forming part 40 notifies the print control unit 50 of the completion of the print job. The print control unit 50 deletes the entry (print information) of the print job for which the printing has completed from the job management table 22, and notifies the analysis part 30 of the completion of the print job. The analysis part 30 notifies the host computer as the host device 70 of the completion of the printing via the communication part 10 (S110).

Then, the print control unit 50 reads out the job management table 22 and confirms whether or not there are any unexecuted print jobs (S111). When there are unexecuted print job(s) (Yes, S111), the process returns to S102, and the same process is repeated to execute unexecuted print jobs. When there is no unexecuted print job (No, S111), the process ends.

Next, print operations of the printing device 1 in the case when a failure occurs are described with reference to the flow diagram in FIG. 4. As a result of confirmation by the image forming part 40 at S104 and S105, when a failure has occurred (Yes, S105), the image forming part 40 notifies the print control unit 50 of the failure information, and the print control unit 50 causes the display operating part 60 to display the failure information, and analyzes the failure content (S112). When the failure content is "No color toner," which corresponds to the case of when at least one of the color toners used for printing becomes lower than a predetermined amount (Yes, S113), the print control unit 50 reads out the color information 22b (FIG. 2) from the job management table 22, and confirms whether or not there is a print job for monochrome printing in subsequent print jobs (S114).

Furthermore, when the failure content is "No color toner," as described above, the image forming part 40 turns into the print suspension state in which the supply of the subsequent print sheets is stopped, and in which the processing of all print sheets in the middle of the image forming process is completed and the print sheets are ejected to the stacker.

When there is a print job for monochrome printing in subsequent print jobs (Yes, S114), the print control unit 50 confirms the recovery operation setting 51. When the recovery operation setting 51 is "Cancel Mode" ("Cancel Mode," S115), the print control unit 50 confirms the cancel condition setting 53 (S116). When the cancel condition setting 53 is "Reprintable" ("Reprintable," S116), the print control unit 50 reads out the image information storage flag 22d of the suspended print job. When the read-out image information storage flag 22d is "OFF" (No, S117), the print control unit 50 waits for only the time period of the cancel standby time 52 (S118), and confirms whether or not the occurred failure, that is, "No color toner," has been recovered (S119).

When the recovery has not been detected (No, S119), the print control unit 50 instructs the image forming part 40 to stop the suspended print job, deletes the image information of the suspended print job from the image buffer 21, and deletes the print information of the print job from the job management table 22. Then, the print control unit 50 notifies the analysis part 30 of the stoppage of the execution of the print job, and the analysis part 30 notifies the host computer (not shown) of the stoppage of printing via the communication part 10 (S120). Then, the process returns to S111, and the process thereafter is repeated. Further, when the cancel condition setting 53 is "No Conditions" ("No Condition," S116), the printing device 1 directly executes the process at S118 and thereafter.

In the meantime, when the failure content is other than "No color toner" (No, S113) in the determination at S113, when no print job for monochrome printing is included in the subsequent print jobs in the determination at S114 (No, S114), when the recovery operation setting 51 is the "Standby Mode" in the determination at S115 ("Standby Mode," S115) and when the read-out image information storage flag 22d is "ON" in the determination at S117 (Yes, S117), the printing device 1 puts the processing on hold until the user corrects the failure in accordance with the failure information displayed on the display operating part 60 (S121).

Then, the printing device 1 deletes the failure information displayed on the display operating part 60 when the user corrects the failure (S122) and repeats the process at S109 and thereafter by returning to S109. Further, even when the "No color toner" state has been recovered in the determination at S119 (Yes, S119), the printing device 1 similarly executes the process at S122.

Therefore, according to the flow diagrams shown in FIG. 3 and FIG. 4, even if the failure of "No color toner" occurs when a new print job for color printing is executed, when there is a print job for monochrome printing in the unexecuted print jobs, by setting the recovery operation setting to the "Cancel Mode," at least when the job data of the print job is not all received, the process to return to S111 (FIG. 3) via S120 to stop the print job is repeated. When the print job for monochrome printing is processed, since the process moves from S105 to S106, the monochrome printing is executed without waiting for the failure recovery process by the user at S121.

In addition, when the cancel condition setting is "No Condition," even if the job data of the print job of new color printing is all received, the print job is stopped and the monochrome printing is executed in the same manner. On the other hand, when the cancel condition setting is "Reprintable," when the new print job for color printing is a print job which job data has entirely been received, the print job is continued after waiting for the failure recovery process at S121, without stopping the print job.

Furthermore, by configuring the host computer as a host device 70 to maintain the print job data of the print job until the host computer receives a notification from the printing device 1 of the completion of the print job, even if the printing device 1 stops the print job process and deletes the print information and the image information for the print job, it becomes possible to re-execute the same print job.

Further, at S112, although the print control unit 50 notifies the user of the failure information by displaying the failure information on the display operating part 60, the user may also be notified of the failure information by transmitting the failure information to the host computer as a host device 70, which is an external device, or by sending an e-mail or a command to the user via the analysis part 30 and the transmitting part 10B of the communication part 10.

In addition, at S112, in a case where the print control unit 50 executes a print function that the user selects to execute via the display operating part 60, (such as a copy function to read out and print an image of a document) by storing the notified failure information, and when there is no color toner, the print control unit 50 may inactivate the color copy function and activate only the monochrome copy function. Then, the user's operation may be notified to the print control unit 50.

As described above, according to printing device 1 of the present embodiment, there is an advantage that, when a color toner(s) runs out and a new color print job is temporarily suspended, even if a user abandons the print job, when a monochrome print job is included in print jobs processed after the current print job, the suspended print job is stopped, and the monochrome print job is immediately executed, without waiting for the user's recovery operation.

Second Embodiment

Figure 5:
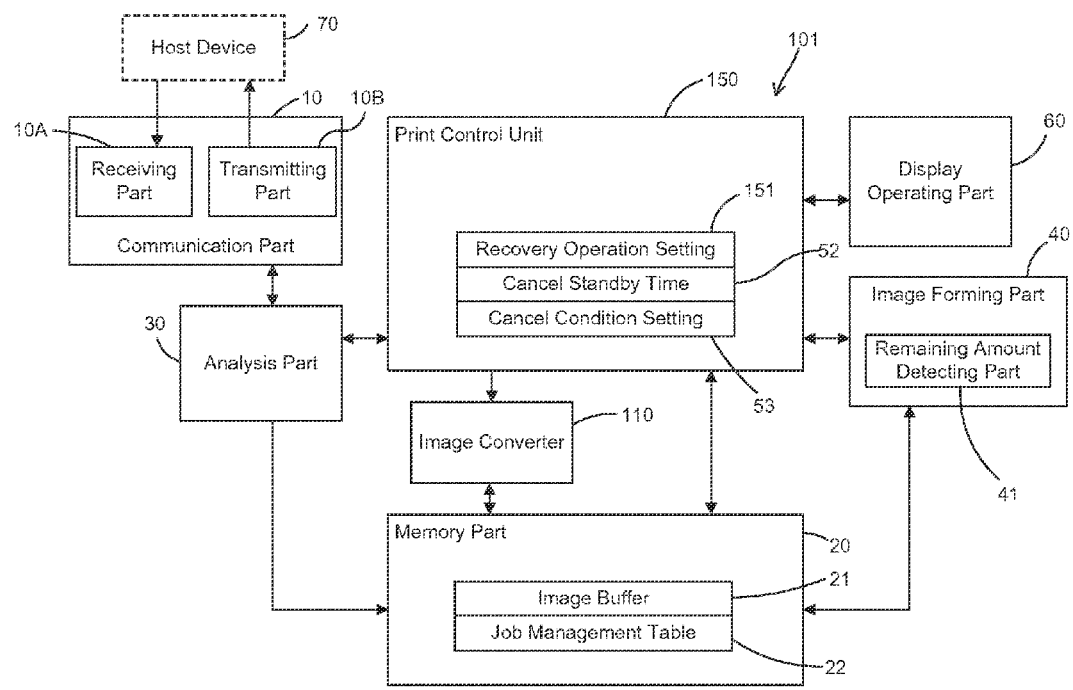
FIG. 5 is a block diagram showing a configuration of the main parts of the printing device in a second embodiment according to the present application.

FIG. 5 is a block diagram showing a configuration of the main parts in the printing device of the second embodiment according to the present application.

Major differences of the printing device 101 in the present embodiment relative to the printing device 1 of the first embodiment shown in FIG. 1 are settings for a recovery operation setting 151 and an addition of a converter (e.g., image converter 110). Therefore, explanations for parts in the printing device 101 of the present embodiment that are in common with those of the printing device 1 in the first embodiment are omitted by marking the common parts with the same symbols or by omitting the common parts from drawings. The differences are focused on for purposes of explanation.

A print control unit 150 is a part that controls the print process of the image forming part 40. The print control unit 150 receives a reception notification of the print job received from the analysis part 30, reads out print information from the job management table 22 based on the job number associated with the notification, and instructs the image forming part 40 to print. In addition, the print control unit 150 causes the display operating part 60 to display the contents of the notification thereon and controls the print process of the image forming part 40 based on the pre-set recovery operation setting 151 as described later.

For the recovery operation setting 151, in addition to the "Standby Mode" and "Cancel Mode" explained in connection with the recovery operation setting 51 of the first embodiment, a "Monochrome Mode" can be set for instructing a conversion of color image information of a print job that has been suspended due to "No color toner" into monochrome image information.

An image converter 110, based on an instruction from the print control unit 150, reads out image information from the image buffer 21 of the memory part 20, converts color image information to monochrome image information, and stores the converted image information in the image buffer 21 of the memory part 20.

Figure 6:
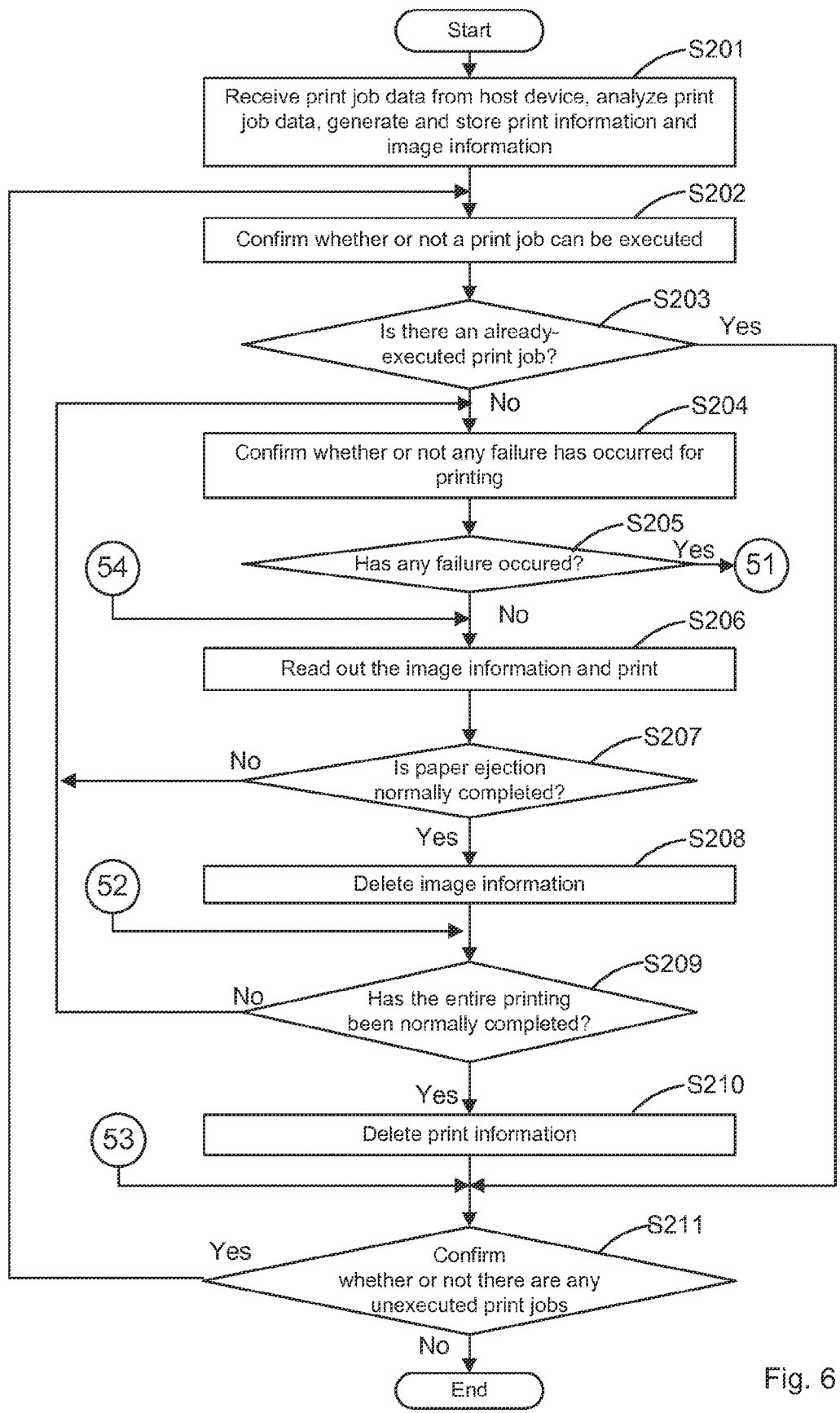
FIG. 6 is a flow diagram showing the printing operation of the printing device in the second embodiment.
Figure 7:
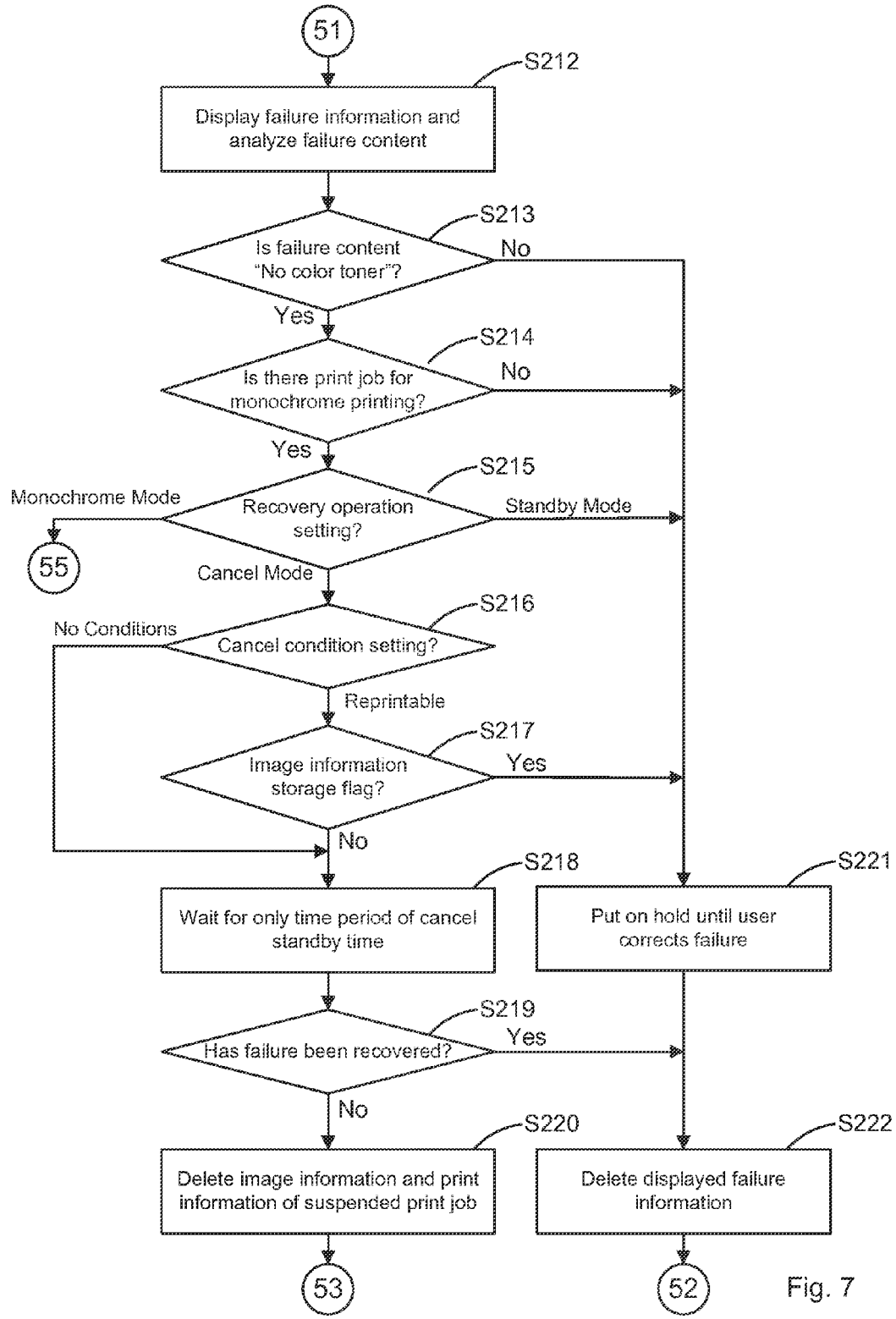
FIG. 7 is a flow diagram showing the operation of the printing device at the time when a failure occurs in the second embodiment.
Figure 8:
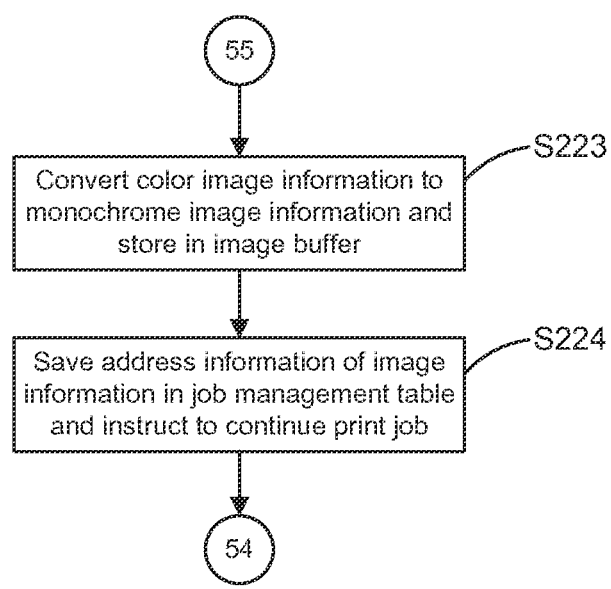
FIG. 8 is a flow diagram showing the operation of the printing device at the time when a failure occurs in the second embodiment.

FIG. 6 is a flow diagram showing the print operation of the printing device 101 in the present embodiment, and FIG. 7 and FIG. 8 are flow diagrams showing the operation when a failure occurs in the printing device 101 of the present embodiment. The operation of the printing device 101 is explained hereafter with reference to the flow diagrams.

Furthermore, S201 to S211 in FIG. 6 are similar to S101 to S111 in the flow diagram of FIG. 3 showing the print operation of printing device 1 in the first embodiment. S212 to S214 and S216 to S222 in FIG. 7 are similar to S112 to S114 and S116 to S122, respectively, in the flow diagram of FIG. 4 showing the operation of the printing device 1 at the time when a failure occurs in the first embodiment. Therefore, explanations for each of these steps are omitted. Explanations are primarily provided concerning the operation of the printing device 101 in the case where the recovery operation setting 100 is set to the "Monochrome Mode," with reference to the flow diagrams of FIG. 7 and FIG. 8.

The print control unit 150, at S214, reads out the color information 22b (FIG. 2) of the job management table 22, and a print job for performing monochrome printing is confirmed in successive print jobs (Yes, S214), the print control unit 150 confirms the recovery operation setting 151.

When the recovery operation setting 151 is in the "Monochrome Mode" ("Monochrome Mode," S215), the print control unit 150 reads out the image information address 22c (FIG. 2) of the suspended print job from the job management table 22, and notifies the image converter 110 of the image information address 22c as an image information conversion instruction. The image converter 110 reads out color image information from the image buffer 21 in accordance with the notification from the print control unit 150. After the read-out image information is converted to monochrome image information, the image information is stored in an area within the image buffer 21 which is different from that of the read-out image information. After storing all of the post-conversion image information in the image buffer 21, the image converter 110 deletes the pre-conversion image information from the image buffer 21, and notifies the print control unit 150 of the address information of the image information storing the post-conversion image information (S223).

Based on the notification from the image converter 110, the print control unit 150 saves the address information of the image information at which the post-conversion image information is stored, in the image information address 22c of the job management table 22, and instructs the image forming part 40 to continue the print job according to the post-conversion image information (S224).

Therefore, according to the flow diagrams shown in FIG. 6 and FIG. 7, when a new print job for color printing is executed, even if a "No color toner" failure occurs, when there is a monochrome print job in the unexecuted print jobs, because the color printing is converted to monochrome printing and the print job is continued by changing the recovery operation setting to the "Monochrome Mode," monochrome printing is executed without waiting for failure recovery process by the user at S221.

As described above, according to the printing device of the present embodiment, there is an advantage that, when a color toner runs out and a new color print job is temporarily suspended, even if a user abandons the print job, when there is a monochrome print job subsequent to the current print job, the printing is continued by converting the image information of the suspended print job to monochrome, and, with a print job that designates monochrome printing, the monochrome print job can immediately be executed without any waiting.

In each of the above-described embodiments, the explanations are made with a printing device as an example. However, the configuration is not limited to those described above, and may be applied to a facsimile machine, a photocopier, and a multifunction machine in which a facsimile machine and a photocopy machine are integrated.

What is claimed is:

1. A printing device, comprising:
a receiving part that receives print job data;
an analysis part that generates image information and print information including print conditions for the image information based on the print job data;
a memory part that stores the image information and the print information;
an image forming part that executes a print process of the image information using a first consumable and a second consumable, and that includes a remaining amount detecting part that detects a remaining amount of the first consumable; and
a print control unit that controls the print process by the image forming part based on the print information, the print control unit performing one of a first process and a second process when the remaining amount of the first consumable detected by the remaining amount detecting part is lower than a predetermined amount, wherein
when the remaining amount of the first consumable is detected to be lower than the predetermined amount, the print control unit temporarily suspends the print process by the image forming part for first print job data that uses the first consumable and causes the suspended print process for the first print job data to wait until second print job data is received, and
when the print information corresponding to the second print job data is received, the print control unit performs one of the first process and the second process on the suspended print process for the first print job data that uses the first consumable.

2. The printing device according to claim 1, wherein
when operation of the suspended print process for the first print job data that uses the first consumable is stopped, the print control unit starts a print process for the subsequent second print job data after performing the one of the first process and the second process on the suspended print process for the first print job data.

3. The printing device according to claim 1, further comprising:
a converter that converts image information to be printed using the first consumable into image information to be printed using the second consumable, wherein
after performing the one of the first process and the second process on the suspended print process for the first print job data that uses the first consumable, the print control unit causes the converter to convert the image information of the suspended print process for the first print job data into print information to be printed using the second consumable.

4. The printing device according to claim 1, wherein
the first consumable is a color developer, and
the second consumable is a monochrome developer.

5. The printing device according to claim 1, further comprising:
a display part, wherein
when the remaining amount of the first consumable becomes lower than the predetermined amount, the print control unit causes the display part to display the remaining amount of first consumable that has become lower than the predetermined amount.

6. The printing device according to claim 1, further comprising:
a transmitting part, wherein
when the remaining amount of the first consumable becomes lower than a predetermined amount, the print control unit transmits a notification that the remaining amount of the first consumable has become lower than the predetermined amount to an external device via the transmitting part.

7. The printing device according to claim 1, wherein
the receiving part receives the print job data via a facsimile communication line.

8. The printing device according to claim 1, wherein
the print control unit performs the one of the first process and the second process on the suspended print process for the first print job data that uses the first consumable before the analysis of the first print job data by the analysis part is completed.

9. The printing device according to claim 1, wherein
the one of the first process and the second process to be performed is preset before the receiving part receives the print job data.

10. The printing device according to claim 1, wherein
the second print job data includes the print process that uses a consumable of which the remaining amount is not determined to be lower than the predetermined amount.

11. The printing device according to claim 1, wherein
when the second print job data includes the print process that uses the first consumable of which the remaining amount is detected to be lower than the predetermined amount, the print control unit causes the suspended print process for the first print job data to continue waiting until print job data that includes a print process that does not use the first consumable is received or until the remaining amount of the first consumable is changed to be more than the predetermined amount.

12. The printing device according to claim 1, wherein
when the remaining amount of the first consumable is detected to be lower than the predetermined amount, the print control unit stops operation of the suspended print process for the first print job data by stopping supply of a subsequent medium and by ejecting a medium that has already been supplied.

13. The printing device according to claim 1, wherein
the first process is one of a standby mode, a cancel mode and a monochrome print mode, and
the second process is one of the standby mode, the cancel mode and the monochrome print mode that is different from the first process.

14. The printing device according to claim 13, wherein the cancel mode includes a no condition mode and a reprintable mode.

15. The printing device according to claim 14, wherein the reprintable mode is a mode in which the print process for the first print job data is cancelled if a receipt of the first print job data, of which the print process has been suspended, has not been completed.

16. A print job control method, comprising:
receiving print job data;
analyzing the print job data;
generating image information and print information including print conditions for the image information based on the print job data;
storing the image information and the print information;
performing a print process for the image information using a first consumable and a second consumable;
detecting a remaining amount of the first consumable;
performing one of a first process and a second process when the remaining amount of the first consumable is determined to be lower than a predetermined amount;
when the remaining amount of the first consumable is detected to be lower than the predetermined amount, temporarily suspending the print process for the first print job data that uses the first consumable and causing the suspended print process for the first print job data to wait until second print job data is received;
when second print job data is received subsequent to the first print job data, performing one of the first process and the second process on the suspended print process for the first print job data; and
performing the print process for the second print job data after performing the one of the first process and the second process on the suspended print process for the first print job data.

17. The print job control method according to claim 16, further comprising:
when the remaining amount of the first consumable is detected to be lower than the predetermined amount, displaying the remaining amount of the first consumable that has become lower than the predetermined amount on a display part.

18. The print job control method according to claim 16, further comprising:
when the remaining amount of the first consumable is detected to be lower than the predetermined amount, transmitting a notification that the remaining amount of the first consumable has become lower than the predetermined amount to an external device.

19. The print job control method according to claim 16, wherein
the one of the first process and the second process on the suspended print process for the first print job data is performed before the analysis of the first print job data is completed.

20. The print job control method according to claim 16, wherein
the one of the first process and the second process to be performed is preset before receiving the print job data.

21. The print job control method according to claim 16, wherein
the second print job data includes the print process that uses a consumable of which the remaining amount is not determined to be lower than the predetermined amount.

22. The print job control method according to claim 16, wherein
when the second print job data includes the print process that uses the first consumable of which the remaining amount is detected to be lower than the predetermined amount, the suspended print process for the first print job data is caused to continue waiting until print job data that includes a print process that does not use the first consumable is received or until the remaining amount of the first consumable is changed to be more than the predetermined amount.

23. The print job control method according to claim 16, wherein
when the remaining amount of the first consumable is detected to be lower than the predetermined amount, operation of the suspended print process for the first print job data is stopped by stopping supply of a subsequent medium and by ejecting a medium that has already been supplied.

24. The print job control method according to claim 16, wherein
the first process is one of a standby mode, a cancel mode and a monochrome print mode, and
the second process is one of the standby mode, the cancel mode and the monochrome print mode that is different from the first process.

25. The print job control method according to claim 24, wherein
the cancel mode includes a no condition mode and a reprintable mode.

26. The print job control method according to claim 25, wherein
the reprintable mode is a mode in which the print process for the first print job data is cancelled if a receipt of the first print job data, of which the print process has been suspended, has not been completed.

27. The print job control method according to claim 16, further comprising:
after performing the one of the first process and the second process on the suspended print process for the first print job data that uses the first consumable, converting the image information of the suspended print process for the first print job data into print information to be printed using the second consumable.

* * * * *